UNITED STATES PATENT OFFICE 3,655,743
Patented Apr. 11, 1972

3,655,743
SUBSTITUTED 4 - BIPHENYL-4-HYDROXY
CROTONIC ACIDS AND SALTS THEREOF
Josef Nickl and Wolfhard Engel, Biberach (Riss), Albrecht Eckenfels, Warthausen-Oberhofen, and Ernst Seeger and Gunther Engelhardt, Biberach (Riss), Germany, assignors to Boehringer Ingelheim G.m.b.H., Ingelheim (Rhine), Germany
No Drawing. Filed Nov. 12, 1970, Ser. No. 88,983
Claims priority, application Germany, Nov. 17, 1969, P 19 57 750.5; Sept. 29, 1970, P 20 47 804.0, P 20 47 805.1, P 20 47 802.8, P 20 47 803.9
Int. Cl. C07d 87/36; C07c 65/14
U.S. Cl. 260—247.2 R                 7 Claims

ABSTRACT OF THE DISCLOSURE

Compounds of the formula

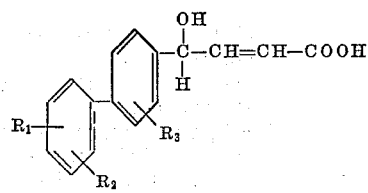

wherein, of the three substituents $R_1$, $R_2$ and $R_3$,
one is hydrogen, and
two are selected from the group consisting of hydrogen, lower alkyl, halogen, hydroxy-lower alkyl, nitro, amino, acetylamino, cyano, aminocarbonyl, dimethylaminocarbonyl, carbethoxy, hydroxyl, methoxy, methylthio, methylsulfinyl and methylsulfonyl, and non-toxic, pharmacologically acceptable salts thereof; the compounds as well as their salts are useful as anticoagulants, antiphlogistics, analgesics and antitussives.

---

This invention relates to novel 4-biphenylyl-4-hydroxycrotonic acids and non-toxic salts thereof, as well as to a method of preparing these compounds.

More particularly, the present invention relates to a racemic mixture of a compound of the formula

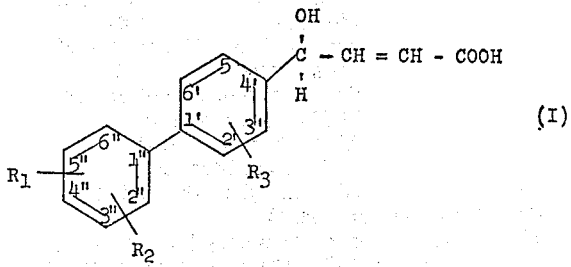

wherein, of the three substituents $R_1$, $R_2$ and $R_3$,
one is hydrogen, and
two, which may be identical to or different from each other, are selected from the group consisting of hydrogen, lower alkyl, halogen, hydroxy-lower alkyl, nitro, amino, acetyl-amino, cyano, aminocarbonyl, dimethylaminocarbonyl, carbethoxy, hydroxyl, methoxy, methylthio, methylsulfinyl and methylsulfonyl, an optically active antipode component thereof, or a non-toxic, pharmacologically acceptable salt or said racemic mixture or optically active antipode formed with an inorganic or organic base.

A compound embraced by Formula I is preferably prepared by reducing a 3-(4′phenyl-benzoyl)-acrylic acid of the formula

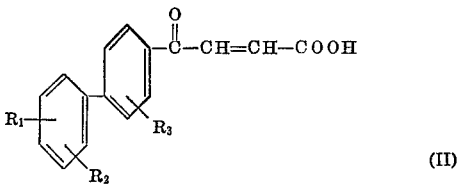

wherein $R_1$, $R_2$ and $R_3$ have the same meanings as in Formula I, with a complex metal hydride, such as sodium borohydride, potassium borohydride or lithium aluminum hydride, or with a complex alkoxy-aluminum hydride, such as sodium bis-(2-methoxy-ethoxy)-dihydroaluminate, in the presence of an inert solvent, such as ether, tetrahydrofuran, methanol, benzene or water, and at a temperature between —20 and +60° C.

However, a compound of the Formula I may also be prepared by reducing a compound of the Formula II with activated aluminum or aluminum amalgam in a water-containing solvent, such as moist ether, at room temperature.

Finally, a compound of the Formula I may also be prepared by reducing a compound of the Formula II with an alcoholate in the presence of a primary or secondary alcohol, such as with aluminum isopropylate in the presence of isopropanol, at elevated temperatures, preferably at the boiling point of the alcohol, while continuously distilling off the ketone, such as acetone, released by the reaction.

A racemic mixture of a compound of the Formula I thus obtained may, if desired, be separated into its two optically active antipode components pursuant to conventional optically active antipode separation procedures, such as by fractional crystallization of a salt of the racemic mixture formed with an optically active auxiliary base, such as the (—)-cinchonidine salt in acetone or the (—)-α-phenylethylamine salt in water.

A racemic mixture or optically active antipode of a compound of the Formula I may, if desired, be converted into a salt thereof with an inorganic or organic base by conventional methods. Examples of non-toxic, pharmacologically acceptable salts are those formed with sodium carbonate, lithium hydroxide, potassium hydroxide, ammonia, cyclohexylamine, dimethylamino-ethanol-amine, diethanolamine, isobutylamine, morpholine or the like.

The starting compounds of the Formula II, wherein at least one of $R_1$, $R_2$ and $R_3$ is other than hydrogen, are new compounds; however, they may be prepared by methods described in the literature, such as by Friedel-Crafts acylation of a corresponding biphenyl with maleic acid anhydride in the presence of aluminum chloride [see, for example, H. G. Oddy, J.A.C.S. 45, 2156 (1923)].

The majority of the correspondingly substituted biphenyls required for the preparation of the compounds of the Formula II above referred to are described in the literature, and those which are not may be prepared by methods described in the literature, such as by reacting a correspondingly substituted phenyl-diazonium salt with benzene is the presence of sodium hydroxide or sodium acetate. Fluorosubstituted biphenyls may also be prepared by thermal decomposition of a corresponding biphenyl-diazonium-tetrafluoroborate.

Finally, the starting compounds of the Formula II may also be prepared by subjecting a correspondingly substituted biphenyl methyl ketone to a condensation reaction with glyoxylic acid hydrate in the presence of an acid, such as formic acid or acetic acid, or by introducing the desired substituent into 3-[4'-phenyl-benzoyl]-acrylic acid pursuant to conventional methods.

The following examples further illustrate the present invention and will enable others skilled in the art to understand it more completely. It should be understood, however, that the invention is not limited solely to the particular examples given below.

PREPARATION OF STARTING COMPOUNDS OF THE FORMULA II

EXAMPLE A (a) 4-chloro-2-cyano-diphenyl 183.0 gm. (1.2 mols) of 2-amino-5-chloro-benzonitrile were triturated with 255 ml. of concentrated hydrochloric acid to form a slurry, and a solution of 82.8 gm. (1.2 mols) of sodium nitrite in 120 ml. of water was added dropwise thereto. Thereafter, 3.76 liters of benzene were added to the resulting diazonium salt solution, and then, while maintaining the temperature of the mixture between 6 and 7° C., a solution of 58.3 gm. (1.46 mols) of sodium hydroxide in 90 ml. of water was added dropwise thereto. The resulting mixture was stirred for 10 hours while its internal temperature was allowed to rise to 10° C.; thereafter, it was filtered, the organic phase was separated and washed with water until free from alkali, dried over sodium sulfate, the benzene was evaporated in vacuo, and the residue (B.P. 141–145° C. at 0.1 mm. Hg) was distilled. The distillate solidified into a crystalline mass. 112 gm. of 4-chloro-2-cyanodiphenyl, M.P. 88–90° C., were obtained.

(b) 3-[4'-(4''-chloro-2''-cyano-phenyl)-benzoyl]-acrylic acid

A powdered mixture of 110.0 gm. (0.52 mol) of 4-chloro-2-cyano-diphenyl and 53.6 gm. (0.55 mol) of maleic acid anhydride was added to a suspension of 280.0 gm. (2.10 mols) of anhydrous aluminum chloride in 320 ml. of dry 1,2-dichloro-ethane at 0° C., whereby the temperature of the resulting mixture rose to 25° C. Subsequently, an additional 160 ml. of dry 1,2-dichloro-ethane were added, and the mixture was stirred for six hours at room temperature and then allowed to stand for 48 hours at room temperature under exclusion of moisture. Thereafter, the reaction mixture was stirred into a mixture of 500 gm. of crushed ice and 500 ml. of concentrated hydrochloric acid, the resulting mixture was allowed to stand for one hour, and the precipitated reaction product was then collected by vacuum filtration and thoroughly washed with water. 162 gm. of 3-[4'-(4''-chloro - 2'' - cyano-phenyl)-benzoyl]-acrylic acid, M.P. 208–210° C., were obtained.

EXAMPLE B

3-[4'-(2''-fluoro-phenyl)-benzoyl]-acrylic acid

First 30.9 gm. (0.315 mol) of maleic acid anhydride and then, after a few minutes, 54.2 gm. (0.315 mol) of 2-fluoro-diphenyl were introduced into a stirred mixture consisting of 100 ml. of trichloroethylene, 25 ml. of nitrobenzene and 84.0 gm. (0.65 mol) of anhydrous aluminum chloride at 20° C., and the resulting mixture was stirred for six hours at room temperature and then allowed to stand for six days at room temperature. Thereafter, a mixture of ice and hydrochloric acid was added, the trichloroethylene and nitrobenzene were removed by steam ditsillation, and the residual aqueous solution was allowed to cool. The precipitate formed thereby was collected by vacuum filtration, dried and recrystallized from 500 ml. of toluene. 70% of theory of 3-[4'-(2''-fluoro-phenyl)-benzoyl]-acrylic acid, M.P. 167° C., was obtained.

Using a procedure analogous to that described in Example A or B, the following starting compounds of the Formula II were also prepared:

3-[4'-(4''-isobutyryl-phenyl)-benzoyl]-acrylic acid, M.P. 210–212° (from ethyl acetate);
3-[4'-(2''-nitro-phenyl)-benzoyl]-acrylic acid, M.P. 212° C. (from ethanol);
3-[4'-(2''-chloro-4''-nitro-phenyl)-benzoyl]-acrylic acid;
3-[4'-(2''-acetylamino-phenyl)-benzoyl]-acrylic acid, M.P. 174–175° C. (from ethyl acetate);
3-[4'-(4''-acetylamino-phenyl)-benzoyl]-acrylic acid, M.P. 258–260° C. (decomp.);
3-[4'-(2''-cyano-phenyl)-benzoyl]-acrylic acid, M.P. 213–214° C.;
3-[4'-(4''-cyano-phenyl)-benzoyl]-acrylic acid, M.P. 218–219° C. (from ethyl acetate);
3-[4'-(2''-aminocarbonyl-phenyl)-benzoyl]-acrylic acid, M.P. 214–215° C. (from glacial acetic acid);
3-[4'-(4''-dimethylaminocarbonyl-phenyl)-benzoyl]-acrylic acid, M.P. 187–188° C. (from ethyl acetate/methanol);
3-[4'-(2''-carbethoxy-phenyl)-benzoyl]-acrylic acid, an oil;
3-[4'-(4''-carbethoxy-phenyl)-benzoyl]-acrylic acid, M.P. 183–184° C. (from ethyl acetate);
3-[4'-(2''-methylsulfonyl-phenyl)-benzoyl]-acrylic acid, M.P. 205–206° C. (from ethanol);
3-[4'-(3''-methylsulfonyl-phenyl)-benzoyl]-acrylic acid, M.P. 181–182° C. (from methyl acetate);
3-[4'-(4''-methylsulfonyl-phenyl)-benzoyl]-acrylic acid, M.P. 215° C. (from ethyl acetate);
3-[4'-(4''-methoxy-phenyl)-benzoyl]-acrylic acid, M.P. 220° C. (from glacial acetic acid);
3-[4'-(4''-chloro-2''-nitro-phenyl)-benzoyl]-acrylic acid, M.P. 220–222° C. (from glacial acetic acid);
3-[4'-(5''-chloro-2''-acetylamino-phenyl)-benzoyl]-acrylic acid, M.P. 190–192° C. (from ethyl acetate);
3-[4'-(2'',4''-dichloro-phenyl)-benzoyl]-acrylic acid, M.P. 186–188° C. (from xylene);
3-[4'-(4''-fluoro-phenyl)-benzoyl]-acrylic acid, M.P. 191–193° C. (from glacial acetic acid);
3-[4'-(4''-chloro-phenyl)-benzoyl]-acrylic acid, M.P. 209–210° C. (from methyl ethyl ketone);
3-[4'-(4''-bromo-phenyl)-benzoyl]acrylic acid, M.P. 229–230° C. (from glacial acetic acid);
3-[4'-(2''-chloro-phenyl)-benzoyl]-acrylic acid, M.P. 159–161° C. (from benzene);
3-[4'-(2'',3''-dichloro-phenyl)-benzoyl-acrylic acid, M.P. 175–176° C. (from acetone);
3-[4'-(2'',5''-dichloro-phenyl)-benzoyl]-acrylic acid, M.P. 226–228° C. (from glacial acetic acid);
3-[4'-(3'',4''-dichloro-phenyl)-benzoyl]-acrylic acid, M.P. 213–214° C. (from glacial acetic acid);
3-[4'-(2''-fluoro-4''-chloro-phenyl)-benzoyl]-acrylic acid, M.P. 198.5–199.5° C. (from xylene);
3-[4'-(2''-methyl-4''-chloro-phenyl)-benzoyl]-acrylic acid, M.P. 160–161° C. (from benzene);
3-[4'-(2''-bromo-phenyl)-benzoyl-acrylic acid, M.P. 170–171° C. (from xylene);
3-[4'-(2'',4''-difluoro-phenyl)-benzoyl]-acrylic acid, acid, M.P. 181–183° C. (from benzene/ethyl acetate);
3-[4'-(3',4''-difluoro-phenyl)-benzoyl]-acrylic acid, M.P. 177–179° C. (from xylene); and
3-[4'-(2''-chloro-4''-fluoro-phenyl-benzoyl]-acrylic acid, M.P. 187–188° C. (decomp.; from ethyl acetate/petroleum ether).

EXAMPLE C (a) 3'-chloro-4'-phenyl-acetophenone 122.2 gm. (0.722 mol) of 3'-chloro-4'-amino-acetophenone were dissolved by heating in 150 ml. of glacial acetic acid, and the solution was added to 180 ml. of concentrated hydrochloric acid. The mixture was cooled to 5° C. and diazotized by dropwise addition of a solution of 59.8 gm. (0.866 mol) of sodium nitrite in 170 ml. of water. The clear solution of the diazonium salt was admixed with 1.2 liters of benzene, and the mixture was buffered by adding a solution of 58.8 gm. of NaOH in 170 ml. of water. The reaction mixture was stirred for 4 hours at room temperature and then allowed to stand overnight. Thereafter, the benzene layer was separated, washed with 3 N hydrochloric acid and 4 N sodium hydroxide, dried and evaporated. The oily residue was chromatograped on 2.5 kg. of silica gel (0.05–0.2 mm. particle size) with benzene as the eluant. After a small amount of eluant had passed through the reaction product was collected and recrystallized from 100 ml. of deep-cooled methanol. Yield: 61.1 gm. (36.8% of theory); M.P. 43.5–45° C.

(b) 3-(3'-chloro-4'-phenyl-benzoyl)-acrylic acid 62.0 gm. (0.268 mol) of 3'-chloro-4'-phenyl-acetophenone were dissolved in 150 ml. of glacial acetic acid, the solution was added to 24.7 gm. (0.268 mol) of glyoxylic acid hydrate, and the mixture was refluxed, while stirring, for 24 hours. Then, 12.4 gm. more of glyoxylic acid hydrate were added, and the mixture was refluxed for 12 hours more. After cooling, it was poured into 500 ml. of ice water, and the precipitated product was extracted with ethyl acetate. The extract solution was washed, dried and evaporated, yielding 76.0 gm. of a highly viscous, yellow oil having an $R_f$-value of 0.4 to 0.5 (silicagel plates, solvent system: ethyl acetate).

EXAMPLE D

3-[4'-(2''-nitro-phenyl)-benzoyl]-acrylic acid

A solution of 12 gm. (0.05 mol) of 2'-nitro-4-acetyl-diphenyl (M.P. 108–110° C.) in 50 ml. of glacial acetic acid, was admixed with 4.5 gm. (0.05 mol) of glyoxylic acid hydrate, and the reaction mixture was refluxed for 3 hours, while stirring. Then, while refluxing was continued for further 5 hours, 2 gm. of glyoxylic acid hydrate were added twice to the mixture. The solvent was then removed in vacuo, and the residue was washed with water and dissolved in ethyl acetate. The solvent was removed in vacuo again, and the residue was treated with a small amount of ethyl acetate, whereby it crystallized. Yield: 6.0 gm.; M.P. 212° C.

The following compounds were prepared analogous to Examples C and D:

3-[4'-(2''-chloro-phenyl)-benzoyl]-acrylic acid, M.P. 155–156.5° C. (from ethyl acetate);
3-[4'-(4'-methoxy-phenyl)-benzoyl]-acrylic acid, M.P. 220° C. (from glacial acetic acid);
3-[4'-(3'-chloro-4''-methoxy-phenyl)-benzoyl]-acrylic acid, M.P. 190–191° C. (from ethyl acetate);
3-[4'-(4'-chloro-2''-nitro-phenyl)-benzoyl]-acrylic acid, M.P. 220–222° C. (from glacial acetic acid); and
3-[4'-(3'-nitro-phenyl)-benzoyl]-acrylic acid; crystallized from glacial acetic acid with 1 molecule of glacial acetic acid of crystallization. M.P. 165–168° C.

EXAMPLE E

3-[4'-(4''-nitro-phenyl)-3'-nitro-benzoyl]-acrylic acid

While cooling and stirring 15.1 gm. (0.06 mol) of 4-phenyl-benzoyl-acrylic acid were added in portions to 45 ml. of fuming nitric acid, taking care that the temperature did not rise above 40° C. After the addition had gone to completion stirring was continued for 20 minutes, and then the reaction mixture was poured into ice water. The precipitate was filtered off and dissolved in ether. The ethereal layer was dried and evaporated. The residue was recrystallized from methanol, M.P. 210–212° C. (decomp).; yield: 2.4 gm.

EXAMPLE F

3-[4'-(4''-nitro-phenyl)-benzoyl]-acrylic acid 16 gm. of 3-(4'-phenyl-benzoyl)-acrylic acid were dissolved in 300 ml. of concentrated sulfuric acid, and, while stirring, the solution was added dropwise to a solution of 6 gm. of potassium nitrate in 60 ml. of concentrated sulfuric acid at 0° C. After the addition had been finished, stirring was continued for 2 hours at room temperature. The reaction mixture was poured into ice water, and the mixture was extracted with ethyl acetate. The organic layer was separated and the solvent removed in vacuo. The residue was treated with sodium carbonate solution, and the precipitated sodium salt was collected by vacuum filtration and washed with water.

The free acid was obtained by addition of acetic acid to the purified sodium salt. Yield: 6.0 gm. M.P. 210° C. (from glacial acetic acid).

The following compound was prepared in a manner analogous to that described in Examples E and F.

3-[4'-(2''-fluoro-4''-nitro-phenyl)-benzoyl]-acrylic acid, M.P. 193–194° C. (from isopropanol).

EXAMPLE G (a) 4-methylthio-diphenyl

An ice-cold diazonium salt solution, prepared from 212 gm. (1.25 mol) of 4-amino-diphenyl, 242 ml. of concentrated hydrochloric acid, 540 gm. of ice and 86 gm. (1.25 mols) of sodium nitrite in 540 ml. of water in conventional fashion, was added dropwise at 60–70° C. to a solution of 200 gm. (1.25 mols) of potassium ethyl xanthogenate and 162 gm. (1.50 mols) of sodium carbonate in 1080 ml. of water. Subsequently, the mixture was heated for one hour while stirring at 60–70° C. and was then cooled. The organic phase was separated, and the aqueous layer was extracted with chloroform. The combined organic extracts were dried over sodium sulfate, filtered and evaporated in vacuo. The resulting reddish-brown oil (232 gm.) was dissolved in 2 liters of dioxane (free from peroxides), admixed with a solution of 280 gm. (7.0 mols) of sodium hydroxide in 540 ml. of water, and the mixture was refluxed for 2 hours. The dioxane was removed by distillation, and the residue was diluted with water, whereby the precipitated salts were dissolved again. Then, the aqueous solution was extracted with ether, and the ethereal layers were discarded. The aqueous alkaline phase was heated to 45° C., and then 220 gm. (=165 ml.=1.75 mols) of dimethylsulfate were added while maintaining this temperature. Subsequently, the mixture was refluxed for 1 hour and cooled. The organic layer was separated, and the aqueous phase was extracted with benzene. The combined benzene extracts were washed with water, dried over sodium sulfate and evaporated in vacuo. The residue was distilled in a high vacuum (B.P.$_{0.5}$: 154–158° C.). The distilate crystallized upon standing. Yield: 71.0 gm.; M.P.: 94–95° C.

(b) 3-[4'-(4''-methylthio-phenyl)-benzoyl]-acrylic acid

This compound was prepared analogous to Example A by reaction of 50.6 gm. (0.40 mol) of 4-methylthio-diphenyl, with 54.4 gm. (0.555 mol) of maleic acid anhydride in the presence of 298 gm. (2.14 mols) of anhydrous aluminum chloride in 300 ml. of dry 1,2-dichloroethane, and decomposition of the reaction mixture with ice and hydrochloric acid. Yield: 30 gm; M.P. 214° C. (from ethanol).

(c) 3-[4'-methylsulfinyl-phenyl)-benzoyl]-acrylic acid 27.0 gm. (0.091 mol) of 3-[4'-(4''-methylthio-phenyl)-benzoyl]-acrylic acid were suspended in a solution of 3.64 gm. (0.091 mol) sodium hydroxide in 250 ml. of water. While stirring a solution of 20.3 gm. (0.095 mol) of sodium periodate in 250 ml. of water was added dropwise to the suspension at 0° C.; then, stirring was continued for 12 hours at 0° C. and then 72 hours more at room temperature. The alkaline solution was washed with ethyl acetate, and the reaction product was precipitated from the aqueous layer with dilute hydrochloric acid. Yield: 18 gm.; M.P. 182–184° C.

PREPARATION OF END PRODUCTS OF THE FORMULA I

EXAMPLE 1

4-[2′-chloro-biphenylyl-(4′)]-4-hydroxy-crotonic acid and its cyclohexylamine salt 76.5 gm. (0.268 mol) of 3-(2′-chloro-4-phenyl-benzoyl)-acrylic acid were dissolved in 750 ml. of water with the aid of 10.7 gm. (0.268 mol) of sodium hydroxide, and, while stirring the solution at 0 to 5° C., a total of 5.10 gm. (0.134 mol) of sodium borohydride were added thereto in small portions. Thereafter, the resulting mixture was stirred for two hours at 5° C. and for 12 hours at room temperature. Subsequently, the reaction mixture was washed with ether, and then the aqueous phase was acidified with dilute hydrochloric acid and extracted with ether. The ethereal extracts were combined, dried over sodium sulfate, filtered and evaporated. The residue was chromatographed on silica-gel, using diethyl ether as the eluant, the reaction product thus recovered, namely 4-[2′-chloro-biphenylyl-(4′)]-4-hydroxy-crotonic acid, was dissolved in acetone, and the solution was briefly boiled with animal charcoal and then filtered. The filtrate was admixed with cyclohexylamine, and the precipitate formed thereby was collected and recrystallized from a mixture of isopropanol and ethyl acetate (1:1), yielding 16.0 gm. of the salt of the formula

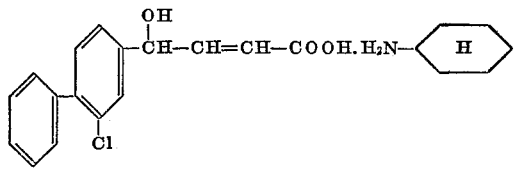

having a melting point of 171–172° C.

EXAMPLE 2

Using a procedure analogous to that described in Example 1, 4 - [3′ - chloro-biphenylyl-(4′)]-4-hydroxy-crotonic acid, M.P. 167–168° C. (decomp.), and its cyclohexylamine salt, M.P. 183–184° C. (recrystallized from methanol-ethyl acetate, 1:1), were prepared from 3-(2′-chloro-4′-phenyl-benzoyl)-acrylic acid.

EXAMPLE 3

Using a procedure analogous to that described in Example 1, 4-[2′,4″-dinitro-biphenylyl-(4′)]-4-hydroxy-crotonic acid and its cyclohexylamine salt, M.P. 150° C. (decomp.; recrystallized from acetone), of the formula

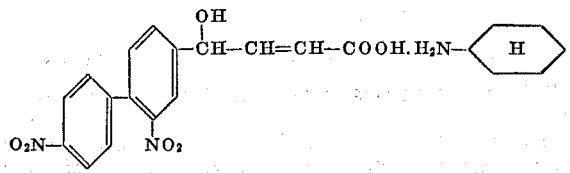

were prepared from 3 - [4′ - (4″-nitro-phenyl)-3′-nitro-benzoyl]-acrylic acid.

EXAMPLE 4

4-[2′,4″-dinitro-biphenylyl-(4′)]-4-hydroxy-crotonic acid and its cyclohexylamine salt A mixture consisting of 6.8 gm. (0.02 mol) of 3-[4′-(4″-nitro-phenyl)-3′-nitro-benzoyl]-acrylic acid, 8.16 gm. (0.04 mol) of aluminum isopropylate and 100 ml. of anhydrous isopropanol was heated, while continuously stirring, on a water bath in a flask provided with a descending condenser, so that a distillate of isopropanol and acetone slowly passed over. Heating in this manner was continued with occasional addition of more isopropanol until the distillate passing over contained no more acetone, which required about 15 hours. Thereafter, the isopropanol was substantially distilled out of the reaction mixture, the residue was admixed with water and then with aqueous 50% sulfuric acid until the aqueous mixture reacted acid, and the resulting solution was extracted with ethyl acetate. The extract solution was washed with water, filtered through charcoal, dried and freed from solvent. The residue was triturated with ether and filtered, the filtrate was freed from solvent, and the residue, 4-[2′,4″-dinitro-biphenylyl-(4′)]-4-hydroxy-crotonic acid, was converted into its cyclohexylamine salt by addition of cyclohexylamine. The salt was recrystallized from acetone, yielding 5.0 gm. of the same compound as in Example 3, M.P. 149–150° C. (decomp.).

EXAMPLE 5

Using a procedure analogous to that described in Example 4, 4-[biphenylyl-(4′)] - 4 - hydroxy-crotonic acid, M.P. 159° C. (recrystallized from benzene/ethylacetate), of the formula

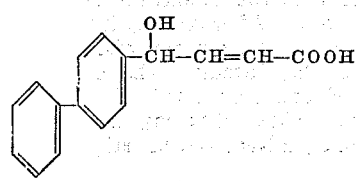

was prepared from 3-(4′-phenyl-benzoyl)-acrylic acid.

EXAMPLE 6

Using a procedure analogous to that described in Example 4, 4-[3″-nitro-biphenylyl-(4′)]-4-hydroxy-crotonic acid and its cyclohexylamine salt, M.P. 175–176° C. (recrystallized from isopropanol), were prepared from 3-[4′-(3″-nitro-phenyl)-benzoyl]-acrylic acid.

EXAMPLE 7

Using a procedure analogous to that described in Example 4, 4-[2″-acetylamino-5″-chloro-biphenylyl-(4′)]-4-hydroxy-crotonic acid of the formula

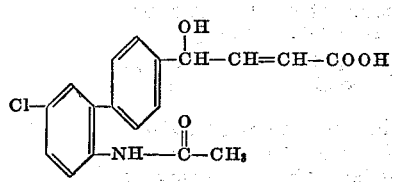

was prepared from 3 - [4′ - (2″ - acetylamino-5″-chlorophenyl)-benzoyl]-acrylic acid.

Its cyclohexylamine salt had a melting point of 185–186° C. after precipitation from acetone and extraction with boiling acetone.

EXAMPLE 8

4-[biphenylyl-(4′)]-4-hydroxy-crotonic acid 10 gm. (0.039 mol) of 3-(4′-phenyl-benzoyl)-acrylic acid were suspended in 120 ml. of methanol, the suspension was admixed with 10 ml. of 4 N sodium hydroxide, an aqueous solution of 0.75 gm. of sodium borohydride was added to the resulting solution of the sodium salt, and the mixture was allowed to stand overnight at room temperature. Thereafter, 100 ml. of water were added, the aqueous solution was acidified with hydrochloric acid, and the precipitate formed thereby was collected and recrystallized from benzene, yielding the same compound as in Example 5, M.P. 159° C.

The free acid thus obtained was dissolved in acetone, an equimolar amount of cyclohexylamine was added to the solution, and the precipitate formed thereby was collected and recrystallized from ethanol, yielding the cyclohexylamine salt of 4-[biphenylyl-(4')]-4-hydroxy-crotonic acid, M.P. 183° C.

In like manner, the following additional salts of 4-[biphenylyl-(4')]-4-hydroxy-crotonic acid were prepared:

Sodium salt, M.P. 240–242° C.;
N,N-dimethyl-ethanolamine salt, M.P. 117–118° C. (recrystallized from butanol);
Ethanolamine salt, M.P. 161–162° C. (recrystallized from methanol);
Diethanolamine salt, M.P. 138–140° C. (recrystallized from n-propanol/cyclohexane);
Isobutylamine salt, 156–158° C. (recrystallized from isopropanol/cyclohexane);
Morpholine salt, M.P. 163° C. (recrystallized from ethanol).

EXAMPLE 9

4-[2''-fluoro-biphenylyl-(4')]-4-hydroxy-crotonic acid

A suspension of 10.3 gm. (0.038 mol) of 3-[4'-(2''-fluoro-phenyl)-benzoyl]-acrylic acid in 120 ml. of methanol was neutralized by addition of 10 ml. of 4 N sodium hydroxide, the resulting solution was admixed with a solution of 0.72 gm. (0.019 mol) of sodium borohydride in 10 ml. of water, and the mixture was allowed to stand for 2 hours at room temperature. Thereafter, the reaction solution was concentrated in vacuo, the residue was diluted with water, the aqueous mixture was acidified with hydrochloric acid, and the resulting solution was extracted with ethyl acetate. The combined extract solutions were dried over sodium sulfate and then evaporated, and the residue was recrystallized from benzene, yielding the free acid of the formula

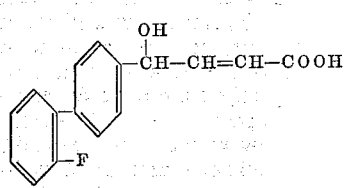

having a melting point of 109–111° C.

The free acid was dissolved in acetone, an equimolar amount of cyclohexylamine was added to the solution, and the precipitate formed thereby was collected and recrystallized from ethanol, yielding the cyclohexylamine salt of 4-[2''-fluoro-biphenylyl-(4')]-4-hydroxy-crotonic acid, M.P. 193° C.

In like manner, the following salts were also prepared:
Sodium salt, M.P. 230–232° C.;
Morpholine salt, M.P. 140–141° C. (recrystallized from isopropanol);
Isobutylamine salt, M.P. 165–166° C. (recrystallized from isopropanol/cyclohexane);
Diethanolamine salt, M.P. 165–167° C. (recrystallized from isopropanol/cyclohexane).

EXAMPLE 10

4-[2'',4''-dichloro-biphenylyl-(4')]-4-hydroxy-crotonic acid 10.3 gm. (0.032 mol) of 3-[4'-(2'',4''-dichlorophenyl)-benzoyl]-acrylic acid were suspended in 100 ml. of water, and the suspension was neutralized with an equimolar amount of sodium hydroxide, whereby the sodium salt of the acid separated out as a fine crystalline precipitate. 0.61 gm. (0.016 mol) of sodium borohydride were added, and the aqueous mixture was stirred for one hour at room temperature. Thereafter, the clear solution formed thereby was acidified with hydrochloric acid, extracted with ethyl acetate, the combined extract solutions were dried and evaporated in vacuo, and the residue was recrystallized from xylene/petroleum ether, yielding the free acid of the formula

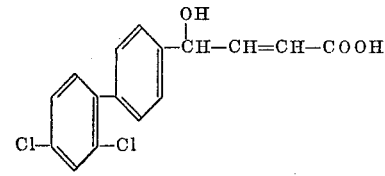

having a melting point of 113–115° C.

The free acid was dissolved in acetone, an equimolar amount of cyclohexylamine was added to the solution, and the precipitate formed thereby was collected and recrystallized from ethanol, yielding the cyclohexylamine salt of the acid, M.P. 191–192° C.

In like manner, the morpholine salt, M.P. 154° C. (recrystallized from ethanol), was prepared.

EXAMPLE 11

4-[biphenylyl-(4')]-4-hydroxy-crotonic acid

A solution of 15.9 gm. of sodium bis-(2-methoxyethoxy)-dihydro-aluminate in benzene (70% solution) was added dropwise to a stirred solution of 5.4 gm. of 3-(4'-phenylbenzoyl)-acrylic acid in 200 ml. of tetrahydrofuran at 10° C., and then the mixed solution was stirred for 90 minutes at 15–20° C. Thereafter, the reaction mixture was poured into about 300 ml. of ice water, the aqueous mixture was acidified with aqueous 15% hydrochloric acid and then extracted with ether, and the ethereal extract was washed with water, dried over sodium sulfate and evaporated in vacuo, leaving 4.2 gm. of a solid residue.

1.5 gm. of this residue were dissolved in a small amount of benzene, and the solution was introduced into a chromatographic column, 2 cm. in diameter and 50 cm. long, charged with 60 gm. of silica gel (particle size 0.2–0.5 mm.). The column was then first eluted with benzene to which 5–10% of ethyl acetate had been added, and subsequently with benzene to which 20% of methanol had been added. The solution obtained from the second elution was evaporated, and the residue was recrystallized from benzene, yielding 0.64 gm. of 4-[biphenylyl-(4')]-4-hydroxy-crotonic acid, M.P. 159° C.

EXAMPLE 12

4-[biphenylyl-(4')]-4-hydroxy-crotonic acid

A suspension of 1.43 gm. of lithium aluminum hydride in 100 ml. of anhydrous tetrahydrofuran was added dropwise over a period of 30 minutes to a stirred solution of 18.9 gm. of 3-(4'-phenyl-benzoyl)-acrylic acid in 200 ml. of anhydrous tetrahydrofuran at −10° C. Thereafter, the reaction mixture was allowed to come to room temperature, whereupon it was stirred for 30 minutes more, and then 200 ml. of ice water and 50 ml. of aqueous 50% sulfuric acid were added.

The resulting solution was transferred to a separating funnel, 200 ml. of ether were added, the mixture was shaken thoroughly, and the organic phase was separated, and the ether was distilled off. The crystalline residue was dissolved in 200 ml. of acetone, cyclohexylamine was added until the solution reacted strongly alkaline. The alkaline solution was refluxed for 30 minutes and then allowed to cool, the yellowish crystalline precipitate was collected by vacuum filtration and suspended in 200 ml. of water, and the aqueous suspension was acidified with hydrochloric acid and extracted twice with 250 ml. of ether each. The combined ethereal extracts were washed with water, and then the ether was evaporated, leaving 3.5 gm. of 4-[biphenylyl-(4')]-4-hydroxy-crotonic acid, M.P. 159° C.

EXAMPLE 13

4-[2″,4″-difluoro-biphenylyl-(4′)]-4-hydroxy-crotonic acid 40.0 gm. (0.139 mol) of 3-[4′-(2″,4″-difluoro-phenyl)-benzoyl]-acrylic acid were suspended in 200 ml. of water, 5.60 gm. (0.139 mol) of sodium hydroxide were added to the solution, and the mixture was cooled to +10° C. While maintaining the temperature at +10° C., a total of 2.60 gm. (0.069 mol) of sodium borohydride were added to the mixture in small portions, and then the reaction mixture was stirred overnight at room temperature. Thereafter, the resulting colorless solution was diluted with 400 ml. of water and extracted twice with 100 ml. of ether each, and the ether extracts were discarded. The aqueous alkaline phase was carefully acidified with aqueous 10% hydrochloric acid, the raw 4-[2″,4″-difluoro-biphenylyl-(4′)]-4-hydroxy-crotonic acid precipitated thereby was taken up in ether, and the resulting solution was washed with water, dried over sodium sulfate, treated with activated charcoal and filtered. The ether was evaporated from the filtrate in vacuo, and the oily residue was chromatographed on a silica gel (300 gm.) column (25 mm. diameter), using as the eluant first a 1:1 mixture of benzene and ethyl acetate, and then ethyl acetate. 16.0 gm. of a colorless, viscous oil which was identified to be 4-[2″,4″-difluoro-biphenylyl-(4′)]-4-hydroxy-crotonic acid of the formula

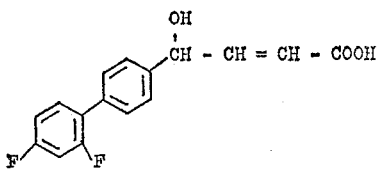

The free acid was dissolved in ethyl acetate, an equimolar amount of morpholine and a small amount of ether were added to the solution, and the precipitate formed thereby was collected and recrystallized from ethyl acetate, yielding the morpholine salt of 4-[2″,4″-difluoro-biphenylyl - (4′)] - 4 - hydroxy-crotonic acid, M.P. 139–140° C.

Dissolution of the free acid in ethyl acetate and addition of an equimolar amount of cyclohexylamine yielded the cyclohexylamine salt, M.P. 181–183° C.

EXAMPLE 14

4-[3″,4″-difluoro-biphenylyl-(4′)]-4-hydroxy-crotonic acid and its morpholine salt 16.1 gm. (0.056 mol) of 3-[4′-(3″,4″-difluoro-phenyl)-benzoyl]-acrylic acid were suspended in 170 ml. of water, 10 ml. of 4 N potassium hydroxide were added to the suspension, and then, while stirring the mixture at 5° C., a solution of 2.1 gm. (0.056 mol) of sodium borohydride in 10 ml. of water was added. The reaction mixture was then stirred for one hour at room temperature, and the clear solution resulting therefrom was carefully acidified with formic acid and extracted with ethyl acetate. The extract solution was washed with water, dried over sodium sulfate, and the solvent was evaporated in vacuo. The residue, 4-[3″,4″-difluoro-biphenylyl-(4′)] - 4 - hydroxy-crotonic acid, was taken up in acetone, an equimolar amount of morpholine was added to the solution, and the precipitate formed thereby was collected and recrystallized from 100 ml. of ethanol. 14.5 gm. of the morpholine salt of 4-[3″,4″-difluoro-biphenylyl-(4′)] - 4 - hydroxy-crotonic acid, M.P. 146–147° C., were obtained.

EXAMPLE 15

4-[2″-nitro-biphenylyl-(4′)]-4-hydroxy-crotonic acid and its cyclohexylamine salt A solution of 2.9 gm. of 3-[4′-(2″-nitro-phenyl)-benzoyl]-acrylic acid in 25 ml. of methanol was neutralized by adding a solution of 0.4 gm. of sodium hydroxide in 25 ml. of water thereto, and then a total of 0.7 gm. of sodium borohydride was added in small portions. The resulting mixture was stirred for 2 hours at room temperature, and the solution formed thereby was then poured into ice water. The aqueous mixture was acidified with dilute hydrochloric acid and extracted with ethyl acetate. The extract, a solution of 4-[2″-nitro-biphenylyl-(4′)]-4-hydroxy-crotonic acid, was washed with water, dried over sodium sulfate, and admixed with an equimolar amount of cyclohexylamine. The precipitate formed thereby was collected and recrystallized from acetone/ethanol, yielding 2.0 gm. of the cyclohexylamine salt of 4-[2″-nitro-biphenylyl-(4′)]-4-hydroxy-crotonic acid, M.P. 179° C. (decomp.), of the formula

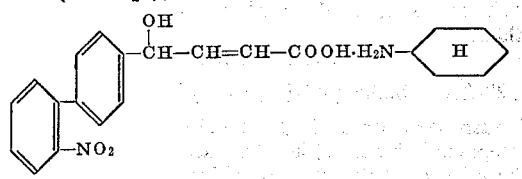

The free acid had a melting point of 147° C. (recrystallized from ethanol).

EXAMPLE 16

4-[4″-chloro-2″-cyano-biphenylyl-(4′)]-4-hydroxy-crotonic acid and its cyclohexylamine salt 48.0 gm. (0.154 mol) of 3-[4′-(4″-chloro-2″-cyano-phenyl)-benzoyl]-acrylic acid were suspended in 180 ml. of water, and the suspension was neutralized with a solution of 8.65 gm. (0.154 mol) of potassium hydroxide in 90 ml. of water, and the neutralized suspension was admixed at 0–5° C. with 4.16 gm. (0.077 mol) of potassium borohydride. The mixture was stirred at that temperature until a clear, colorless solution was formed, which was washed with ether and carefully acidified with formic acid. The precipitate formed thereby, 4-[4″-chloro - 2″ - cyano-biphenylyl - (4′)]-4-hydroxy-crotonic acid, was collected by vacuum filtration and dissolved in ethyl acetate, an equimolar amount of cyclohexylamine and then acetone were added to the solution, and the precipitate formed thereby was collected and recrystallized from ethanol/ethyl acetate. 2.5 gm. of the cyclohexylamine salt of 4-[4″-chloro-2″-cyano-biphenylyl-(4′)]-4-hydroxy-crotonic acid, M.P. 188–189° C., of the formula

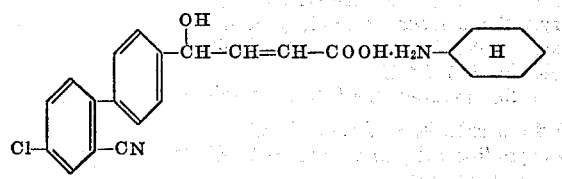

were obtained.

EXAMPLE 17

4-[4″-methylmercapto-biphenylyl-(4′)]-4-hydroxy-crotonic acid 40.0 gm. (0.134 mol) of 3-[4′-(4″-methylmercapto-phenyl)-benzoyl]-acrylic acid were suspended in 180 ml. of water, the suspension was neutralized with a solution of 7.50 gm. (0.134 mol) of potassium hydroxide in 90 ml. of water, the neutralized suspension was placed on an ice bath, and then 3.60 gm. (0.067 mol) of potassium borohydride were added. While on the ice bath, two additional 3.60 gm.-portions of potassium borohydride were added at 2-hour intervals, and the mixture was then stirred at room temperature for 12 hours. The clear, colorless solution obtained thereby was acidified with formic acid, and the resulting precipitate was taken up in ethyl acetate. The solution was washed with water, dried over sodium sulfate and evaporated to dryness, the residue was taken up in acetone, the resulting solution was filtered through silica gel, and the filtrate was again evaporated to dryness. The residue was recrystallized three times from ethyl acetate in the presence of animal charcoal, yielding 3.0 gm. of colorless, crystalline 4-[4″-methylmercapto - biphenylyl - (4′)] - 4 - hydroxy-crotonic acid, M.P. 185–186° C., of the formula

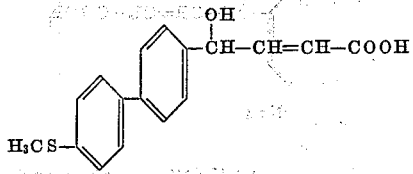

Its morpholine salt had a melting point of 161–162° C. (recrystallized from acetone).

EXAMPLE 18

Using a procedure analogous to that described in Example 10, 4-[4″-fluoro-biphenyl-(4′)]-4-hydroxy-crotonic acid, M.P. 165–166° C. (recrystallized from xylene) was prepared from 3-[4′-(4″-fluoro-phenyl)-benzoyl]-acrylic acid.

M.P. of its cyclohexylamine salt: 188–190° C. (recrystallized from ethanol).

M.P. of its morpholine salt: 163–164° C. (recrystallized from isopropanol).

EXAMPLE 19

Using a procedure analogous to that described in Example 10, 4 - [4″ - chloro-biphenylyl - (4′)]-4-hydroxy-crotonic acid, M.P. 185–186° C. (recrystallized from xylene), was prepared from 3-[4′-(4″-chloro-phenyl)-benzoyl]-acrylic acid.

M.P. of its cyclohexylamine salt: 188–189° C. (recrystallized from ethanol).

EXAMPLE 20

Using a procedure analogous to that described in Example 9, 4 - [4″ - bromo - biphenylyl - (4′)]-4-hydroxy-crotonic acid, of the formula

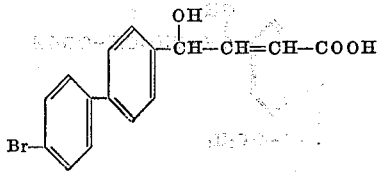

was prepared from 3-[4′-(4″-bromo-phenyl)-benzoyl]-acrylic acid.

M.P. of its cyclohexylamine salt: 197–198° C. (recrystallized from ethanol/ether).

EXAMPLE 21

Using a procedure analogous to that described in Example 9, 4 - [2″ - chloro - biphenylyl - 4′)]-4-hydroxy-crotonic acid, was prepared from 3-[4′-(2″-chloro-phenyl)-benzoylacrylic acid.

M.P. of its cyclohexylamine salt: 190–191° C. (recrystallized from ethanol).

M.P. of its morpholine salt: 150–151° C. (recrystallized from isopropanol).

EXAMPLE 22

Using a procedure analogous to that described in Example 10, 4 - [2″,3″ - dichloro-biphenylyl-(4′)]-4-hydroxy-crotonic acid, was prepared from 3-[4′-(2″,3″-dichlorophenyl)-benzoyl]-acrylic acid.

M.P. of its cyclohexylamine salt: 181–183° C. (recrystallized from ethanol/ether).

EXAMPLE 23

Using a procedure analogous to that described in Example 10, 4 - [2″,5″ - dichloro-biphenylyl-(4′)]-4-hydroxy-crotonic acid, was prepared from 3-[4′-(2″,5″-dichlorophenyl)-benzoyl]-acrylic acid.

M.P. of its cyclohexylamine salt: 182–183° C. (recrystallized from ethanol).

EXAMPLE 24

Using a procedure analogous to that described in Example 10, 4 - [3″,4″ - dichloro-biphenylyl-(4′)]-4-hydroxy-crotonic acid, was prepared from 3-[4′-(3″,4″-dichlorophenyl)-benzoyl]-acrylic acid.

M.P. of its cyclohexylamine salt: 180–182° C. (recrystallized from ethanol).

EXAMPLE 25

Using a procedure analogous to that described in Example 10, 4 - [2″ - methyl - 4″ - chloro-biphenylyl-(4′)]-4-hydroxy-crotonic acid of the formula

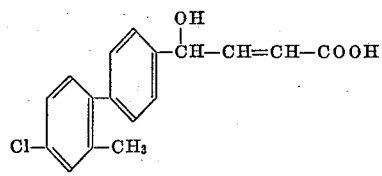

was prepared from 3-[4′-(2″-methyl-4″-chloro-phenyl)-benzoyl]-acrylic acid.

M.P. of its cyclohexylamine salt: 193–194° C. (recrystallized from ethanol).

EXAMPLE 26

Using a procedure analogous to that described in Example 10, 4-[2″-fluoro-4″-chloro-biphenylyl-(4′)]-4-hydroxy-crotonic acid, M.P. 121–123° C., was prepared from 3-[4′-(2″-fluoro-4″-chloro-phenyl)-benzoyl]-acrylic acid.

EXAMPLE 27

Using a procedure analogous to that described in Example 10, 4-[2(″-bromo-biphenylyl-(4′)]-4-hydroxy-crotonic acid, was prepared from 3-[4′-(2″-bromo-phenyl)-benzoyl]-acrylic acid.

M.P. of its morpholine salt: 147–148° C. (recrystallized from isopropanol).

EXAMPLE 28

Using a procedure analogous to that described in Example 11, 4-[2″-chloro-biphenylyl-(4′)]-4-hydroxy-crotonic acid, was prepared from 3-[4′-(2″-chloro-phenyl)-benzoyl]-acrylic acid.

M.P. of its cyclohexylamines salt: 184–185° C.

EXAMPLE 29

Using a procedure analogous to that described in Example 12, 4-[2″-fluoro-biphenylyl-(4′)]-4-hydroxy-crotonic acid, M.P. 109–111° C., was prepared from 3-[4′-(2″-fluorophenyl)-benzoyl]-acrylic acid.

EXAMPLE 30

Using a procedure analogous to that described in Example 11, 4-[2″,4″-dichloro - biphenylyl-(4′)]-4-hydroxy-crotonic acid, M.P. 113–115° C., was prepared from 3-[4′-(2″,4″-dichloro-phenyl)benzoyl]-acrylic acid.

EXAMPLE 31

Using a procedure analogous to that described in Example 13, 4-[4″-fluoro-2″-chloro-biphenylyl-(4′)]-4-hydroxy-crotonic acid, was prepared from 3-[4′-(2″-chloro-4″-fluoro-phenyl)-benzoyl]-acrylic caid.

M.P. of its cyclohexylamine salt: 181–182° C. (recrystallized from acetone).

M.P. of its morpholine salt: 158–159° C. (decomp.; recrystallized from ethyl acetate).

EXAMPLE 32

Using a procecure analogous to that described in Example, 4-[4'''-(1''''-hydroxy-2''''-methyl-n-propyl-1'''')-biphenylyl-(4')]-4-hydroxy-crotonic acid of the formula

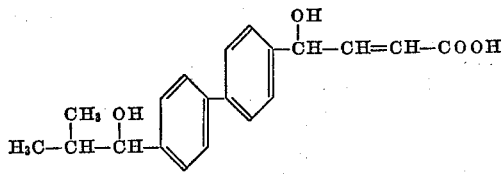

was prepared from 0.1 mol of 3-[4'-(4''-isobutyryl-phenyl)-benzoyl]-acrylic acid, using 0.2 mol of sodium borohydride.

M.P. of its cyclohexylamine salt: 186° C. (recrystallized from isopropanol).

EXAMPLE 33

Using a procedure analogous to that described in Example 15, 4-[4''-nitro-biphenylyl-(4')]-4-hydroxy-crotonic acid, M.P. 204° C. (decomp.; recrystallized from ethyl acetate), was prepared from 3-[4'-(4''-nitro-phenyl)-benzoyl]-acrylic acid.

M.P. of its cyclohexylamine salt: 168° C. (decomp.; recrystallized from ethanol).

EXAMPLE 34

Using a procedure analogous to that described in Example 16, 4-[2''-chloro-4''-nitro-biphenylyl-(4')]-4-hydroxy-crotonic acid, was prepared from 3-[4'-(2''-chloro-4''-nitro-phenyl)-benzoyl]-acrylic acid.

M.P. of its cyclohexylamine salt: 165–166° C. (decomp.; recrystallized from methanol/ethylacetate 1:9).

M.P. of its morpholine salt: 136–138° C. (recrystallized from ethyl acetate).

EXAMPLE 35

Using a procedure analogous to that described in Example 15, 4-[2''-acetylamino-biphenylyl-(4')]-4-hydroxy-crotonic acid was prepared from 3-[4'-(2''-acetylaminophenyl)-benzoyl]-acrylic acid.

M.P. of its cyclohexylamine salt: 130° C. (decomp.; recrystallized from acetone).

EXAMPLE 36

Using a procedure analogous to that described in Example 15, 4-[4''-acetylamino-biphenylyl-(4')]-4-hydroxy-crotonic acid was prepared from 3-[4'-(4''-acetylaminophenyl)-benzoyl]-acrylic acid.

M.P. of its cyclohexylamine salt: 188–189° C. (recrystallized from acetone).

EXAMPLE 37

Using a procedure analogous to that described in Example 15, 4-[2''-cyano-biphenylyl-(4')]-4-hydroxy-crotonic acid was prepared from 3-[4'-(2''-cyano-phenyl)-benzoyl]-acrylic acid.

M.P. of its cyclohexylamine salt: 174.5–175.5° C. (recrystallized from methanol/ethyl acetate).

EXAMPLE 38

Using a procedure analogous to that described in Example 15, 4-[4''-cyano-biphenylyl-(4')]-4-hydroxy-crotonic acid was prepared from 3-[4'-(4''-cyano-phenyl)-benzoyl]-acrylic acid.

M.P. of its morpholine salt: 150–160° (recrystallized from isopropanol/ethyl acetate).

EXAMPLE 39

Using a procedure analogous to that described in Example 15, 4-[2''-aminocarbonyl-biphenylyl-(4')]-4-hydroxy-crotonic-acid of the formula

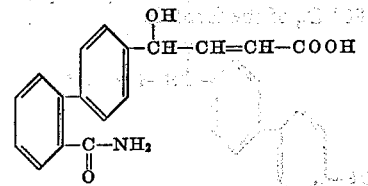

was prepared from 3-[4'-(2''-aminocarbonyl-phenyl)-benzoyl]-acrylic acid.

M.P. of its morpholine salt: 173–174° C. (recrystallized from acetone).

EXAMPLE 40

Using a procedure analogous to that described in Example 15, 4-[4''-dimethylaminocarbonyl-biphenylyl-(4')]-4-hydroxy-crotonic acid, M.P. 205–206° C. of the formula

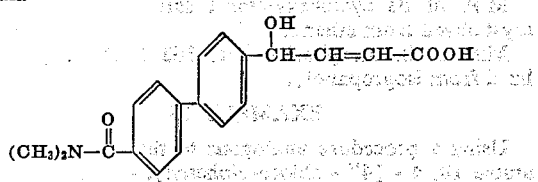

was prepared from 3-[4'-(4''-dimethylaminocarbonyl-phenyl)-benzoyl]-acrylic acid.

M.P. of its cyclohexylamine salt: 182–183° C. (recrystallized from ethanol/ethyl acetate).

EXAMPLE 41

Using a procedure analogous to that described in Example 15, 4-[2''-carbethoxy-biphenylyl-(4')]-4-hydroxy-crotonic acid of the formula

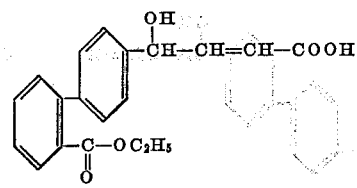

was prepared from 3-[4'-(2''-carbethoxy-phenyl)-benzoyl]-acrylic acid.

M.P. of its cyclohexylamine salt: 143–144° C. (recrystallized from acetone).

EXAMPLE 42

Using a procedure analogous to that described in Example 15, 4-[4''-carbethoxy-biphenylyl-(4')]-4-hydroxy-crotonic acid, M.P. 194–195° C. (recrystallized from ethyl acetate), was prepared from 3-[4'-(4''-carbethoxyphenyl)-benzoyl]-acrylic acid.

M.P. of its cyclohexylamine salt: 177–178° C. (recrystallized from acetone).

EXAMPLE 43

Using a procedure analogous to that described in Example 15, 4-[4''-methoxy-biphenylyl-(4')]-4-hydroxy-crotonic acid, M.P. 187–189° C. (recrystallized from ethyl acetate), of the formula

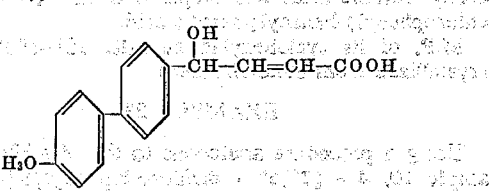

was prepared from 3-[4'-(4"-methoxy-phenyl)-benzoyl]-acrylic acid.

M.P. of its morpholine salt: 129–130° C. (recrystallized from isopropanol).

EXAMPLE 44

Using a procedure analogous to that described in Example 16, 4 - [4" - methylsulfinyl - biphenyl-(4')]-4-hydroxy-crotonic acid of the formula

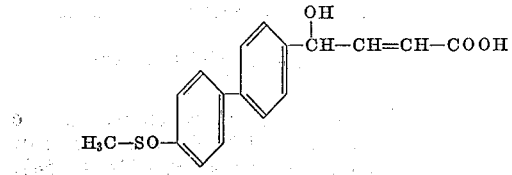

was prepared from 3 - [4' - (4" - methylsulfinyl-phenyl)-benzoyl]-acrylic acid.

M.P. of its cyclohexylamine salt: 161–162° C. (recrystallized from methanol/ethyl acetate).

EXAMPLE 45

Using a procedure analogous to that described in Example 15, 4 - [2" - methylsulfonyl - biphenylyl-(4')]-4-hydroxy-crotonic acid, M.P. 168° C., of the formula

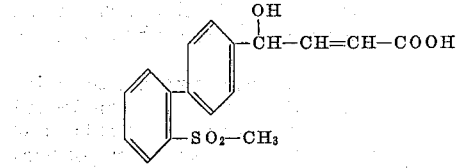

was prepared from 3 - [4' - (2" - methylsulfonyl-phenyl)-benzoyl]-acrylic acid.

M.P. of its cyclohexylamine salt: 165–166° C. (recrystallized from methanol/ethyl acetate).

M.P. of its morpholine salt: 157–158° C. (recrystallized from methanol/ethyl acetate).

EXAMPLE 46

Using a procedure analogous to that described in Example 15, 4 - [3" - methylsulfonyl - biphenylyl-(4')]-4-hydroxy-crotonic acid, M.P. 145–146° C. (recrystallized from isopropanol/petroleum ether), was prepared from 3-[4'-(3"-methylsulfonyl-phenyl)-benzoyl]-acrylic acid.

M.P. of its cyclohexylamine salt: 160–161° C. (recrystallized from acetone).

EXAMPLE 47

Using a procedure analogous to that described in Example 15, 4 - [4" - methylsulfonyl - biphenylyl-(4')]-4-hydroxy-crotonic acid, M.P. 180° C. (recrystallized from methanol/ethyl acetate), was prepared from 3-[4'-(4"-methylsulfonyl-phenyl)-benzoyl]-acrylic acid.

M.P. of its morpholine salt: 151–152° C. (recrystallized from methanol/dioxane).

EXAMPLE 48

Using a procedure analogous to that described in Example 15, 4 - [2" - fluoro-4"-nitro-biphenylyl-(4')]-4-hydroxy-crotonic acid, M.P. 155–156° C., was prepared from 3-[4'-(2"-fluoro-4"-nitro-phenyl)-benzoyl]-acrylic acid.

M.P. of its cyclohexylamine salt: 187–188° C. (recrystallized from acetone).

EXAMPLE 49

Using a procedure analogous to that described in Example 15, 4'[4"-chloro-2"-nitro-biphenylyl - (4')]-4-hydroxy-crotonic acid was prepared from 3-[4'-(4"-chloro-2"-nitrophenyl)-benzoyl]-acrylic acid.

M.P. of its cyclohexylamine salt: 139–140° C. (recrystallized from isopropanol).

EXAMPLE 50

Using a procedure analogous to that described in Example 15, 4-[3"-chloro-4"-methoxy-biphenylyl - (4')]-4-hydroxy-crotonic acid, M.P. 162° C. (recrystallized from ethyl acetate), was prepared from 3-[4'-(3"-chloro-4"-methoxy-phenyl)-benzoyl]-acrylic acid.

M.P. of its cyclohexylamine salt: 178° C. (recrystallized from isopropanol/ether).

EXAMPLE 51

4-(biphenylyl-4')-4-hydroxy-crotonic acid 5.1 gm. (0.02 mol) of 3-(4'-phenyl-benzoyl)-acrylic acid were dissolved in 350 ml. of ether, 3 gm. of aluminum amalgam were added to the solution, and then a total of 3 ml. of water were added at a controlled rate such that the reaction proceeded uniformly. Thereafter, the reaction mixture was stirred for 16 hours at room temperature to make the reaction go to completion, and then 100 ml. of 10% sulfuric acid were added. The ether phase was separated, washed with water and evaporated. The residue was recrystallized from benzene, yielding 3.5 gm. of 4-(biphenyl-4')-4-hydroxy-crotonic acid, M.P. 159° C.

EXAMPLE 52

4-[2",4"-difluoro-biphenylyl-(4')]-4-hydroxy-crotonic acid and its morpholine salt 70% solution of 15.9 gm. of sodium bis(2-methoxyethoxy)-dihydro-aluminate in benzene was added dropwise to a stirred solution of 6.17 gm. (0.0214 mol) of 3-[4'-(2",4"-difluoro-phenyl)-benzoyl]-acrylic acid in 200 cc. of absolute tetrahydrofuran at 10° C., and then the mixture was stirred for 90 minutes at 15–20° C. Thereafter, the reaction mixture was poured into 300 ml. of ice water, and the aqueous mixture was acidified with aqueous 10% hydrochloric acid and then thoroughly extracted with ether. The combined ether extracts were washed with water, dried over sodium sulfate, and the ether was evaporated, leaving 4.80 gm. of a highly viscous oil. This oil was dissolved in a small amount of benzene, and the solution was introduced into a chromatographic column (diameter: 20 mm.) charged with 200 gm. of silicagel (particle size: 0.2–0.5 mm.). The column was then eluted first with benzene to which 5% of ethyl acetate had been added, and then several times with acetone to which 20% of methanol had been added. The third fraction contained 2.05 gm. of 4-[2",4"-difluoro-biphenylyl-(4')]-4-hydroxy-crotonic acid. Treatment of this fraction with an equimolar amount of morpholine, and recrystallization of the precipitate formed thereby from ethyl acetate yielded the morpholine salt of the free acid, M.P. 139–140° C.

EXAMPLE 53

(+)-4-(biphenylyl-4')-4-hydroxy-crotonic acid 25.4 gm. (0.1 mol) of (±)-(biphenylyl-4')-4-hydroxy-crotonic acid were dissolved in a hot mixture of 200 ml. of chloroform and 40 ml. of methanol, the resulting solution was admixed with a solution of 14.7 gm. (0.05 mol) of (−)-cinchonidine in 150 ml. of chloroform, and the mixture was allowed to stand for 30 minutes. Thereafter, the clear solution was evaporated in vacuo, leaving a glassy residue which was treated with boiling acetone. Upon cooling, 24.8 gm. of a crystalline substance, M.P. 183–186° C., were obtained, which was recrystallized twice from isopropanol, yielding 12.4 gm. of (+)-4- biphenylyl-4')-4-hydroxy-crotonic acid, M.P. 188–189° C., specific rotation $[\alpha]_D^{25}=+60.25°$ (c.=0.7 in methanol).

Its morpholine salt had a melting point of 172–173° C. and a specific rotation $[\alpha]_D^{25}=+18.8°$ (c.=0.64 in methanol).

EXAMPLE 54

(+)- and (−)-4-[2″-chloro-biphenyl-(4′)]-
4-hydroxy-crotonic acid 45.1 gm. of (±)-4-[2″-chloro-biphenylyl-(4′)]-4-hydroxy-crotonic acid were precipitated from 250 ml. of acetone as its salt with (−)-α-phenyl-ethyl-amine. The raw salt (46.0 gm., M.P. 166–168° C.) was recrystallized once from 5 liters and twice from 2 liters of boiling water; during the third recrystallization the precipitated salt was collected by vacuum filtration at 52° C. 15 gm. of the sparsely soluble diastereomeric salt, M.P. 165–166° C., were thus obtained. The free (+)-4-[2″-chloro-biphenylyl-(4′)]-4-hydroxy-crotonic acid liberated therefrom with acetic acid had a specific rotation $[\alpha]_D^{23}=+6.6°$ (c.=0.5 in methanol). Its morpholine salt had a melting point of 152–153° C. and a specific rotation $[\alpha]_D^{23}=+3.52°$ (c.=0.5 in methanol).

The aqueous mother liquors from the racemate separation were evaporated, and the residue was again fractionally crystallized. The free (−)-4-[2″-chloro-biphenylyl-(4′)]-4-hydroxy-crotonic acid (3.4 gm.) liberated from the salt thus obtained with acetic acid had a specific rotation $[\alpha]_D^{23}=-8.0°$ (c.=0.5 in methanol); its morpholine salt had a melting point of 152–154° C. and a specific rotation $[\alpha]_D^{23}=-3.13°$ (c.=0.5 in methanol).

The following optically active 4-biphenyl-4-hydroxy-crotonic acids were isolated in analogous manner from the corresponding racemeates:

(+)-4-[2″-fluoro-biphenylyl - (4′)]-4-hydroxy-crotonic acid, $[\alpha]_D^{23}=+34.0°$ (c.=0.5 in methanol); its morpholine salt had a melting point of 149–150° C. and a specific rotation $[\alpha]_D^{23}=+19.1°$ (c.=0.5 in methanol).

(−)-4-[2″-fluoro-biphenylyl - (4′)]-4-hydroxy-crotonic acid, $[\alpha]_D^{23}=-29.1°$ (c.=0.5 in methanol); its morpholine salt had a melting point of 151–152° C. and a specific rotation $[\alpha]_D^{23}=-19.5°$ (c.=0.5 in methanol).

(+)-4-[2″,4″-dichloro-biphenylyl-(4′)] - 4 - hydroxy-crotonic acid, $[\alpha]_D^{23}=+45.1°$ (c.=0.5 in methanol); its morpholine salt had a melting point of 135–136° C. and a specific rotation $[\alpha]_D^{23}=+14.7°$ (c.=0.5 in methanol).

(−)-4-[2″,4″-dichloro-biphenylyl-(4′)] - 4 - hydroxy-crotonic acid, $[\alpha]_D^{23}=-24.7°$ (c.=0.5 in methanol); its morpholine salt has a melting point of 146–147° and a specific rotation $[\alpha]_D^{23}=-6.30°$ (c.=0.5 in methanol).

The compounds according to the present invention, i.e. racemic mixtures of those embraced by Formula I above, optically active antipode components thereof, and non-toxic, pharmacologically acceptable salts of said racemates or antipodes formed with an inorganic or organic base, have useful pharmacodynamic properties. More particularly, the compounds according to the present invention exhibit anticoagulant, antiphlogistic, analgesic and antitussive activities in warm-blooded animals, such as rats resp. mice. All of the compounds of the instant invention possess all of the above properties, although, depending upon the substitution in the biphenylyl moiety, one or more of the activities are more pronounced than the others.

Thus, in the following compounds, for example, the antiphlogistic activity is particularly pronounced:

4-[2″-fluoro-biphenyl-(4′)]-4-hydroxy-crotonic acid;
4-[2″,4″-dichloro-biphenylyl-(4′)]-4-hydroxy-crotonic acid;
4-[2″,4″-difluoro-biphenylyl-(4′)]-4-hydroxy-crotonic acid;
4-[2″-chloro-4″-fluoro-biphenylyl-(4″)]-4-hydroxy-crotonic acid;
4-[2″-cyano-4″-chloro-biphenyl-(4′)]-4-hydroxy-crotonic acid;
4-[4″-fluoro-biphenylyl-(4′)]-4-hydroxy-crotonic acid;
4-[4″-chloro-biphenylyl-(4′)]-4-hydroxy-crotonic acid; and
4-[2″-methyl-4″-chloro-biphenylyl-(4′)]-4-hydroxy-crotonic acid.

In the following compounds, for instance, the antitussive activity is especially pronounced:

4-[biphenylyl-(4′)]-4-hydroxy-crotonic acid;
4-[2″-chloro-biphenylyl-(4′)]-4-hydroxy-crotonic acid;
4-[2″,4″-dichloro-biphenylyl-(4′)]-4-hydroxy-crotonic acid;
4-[2″-fluoro-4″-chloro-biphenyl-(4′)]-4-hydroxy-crotonic acid;
4-[4‴-cyano-biphenylyl-(4′)]-4-hydroxy-crotonic acid;
4-[2″-carbamoyl-biphenylyl-(4′)]-4-hydroxy-crotonic acid; and
4-[3‴-methylsulfonyl-biphenylyl-(4′)]-4-hydroxy-crotonic acid.

The antiphlogistic activity of the compounds of the instant invention was ascertained by the test method of Hillebrecht, Arzneimittelforschung 4, 607–614 (1954), and by the method of Winter et al., Proc. exp. Biol. Med. 111, 544–547 1(962), the raw data being evaluated by the statistical method of Doepfner and Cerletti, Int. Arch. Allergy and Appl. Immunol. 12, 89–97 (1958).

The antitussive activity was ascertained by the method of Engelhorn and Püschmann, Arzneimittelforschung 13, 474–480 (1963).

The analgesic activity was ascertained by the method of Chen and Beckman, Science 113, 631 (1951).

And the anticoagulant activity (prolongation of the bleeding time) was ascertained by the method of Duke, J. A. M.A. 55, 185 (1910).

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like.

The single effective unit dose of a compound with predominantly antiphlogistic activity is from 1.66 to 6.67 mgm./kg., preferably 2.5–5.0 mgm./kg. body weight, and the daily dose rate is from 1.66 to 20 mgm./kg., preferably 3.33 to 10 mgm./kg. body weight.

The single effective unit dose of a compound with predominantly antitussive activity is from 0.166 to 0.834 mgm./kg., preferably 0.417 mgm./kg. body weight, and the daily dose rate is from 0.417 to 3.33 mgm./kg. body weight, preferably 1.25 mgm./kg. body weight.

The following examples illustrate a few dosage unit compositions comprising a compound of the present invention as an active ingredient and represent the best modes contemplated of putting the invention into practical use. The parts are parts by weight unless otherwise specified.

EXAMPLE 55

Tablets

The tablet composition was compounded from the following ingredients:

| | Parts |
|---|---|
| 4 - [2″-fluoro-biphenylyl-(4′)]-4-hydroxy-crotonic acid | 200.0 |
| Corn starch | 97.0 |
| Polyvinylpyrrolidone | 10.0 |
| Magnesium stearate | 3.0 |
| Total | 310.0 |

Preparation

The crotonic acid compound and the corn starch were intimately admixed with each other, the mixture was granulated with an aqueous 14% solution of the polyvinylpyrrolidone through a 1.5 mm.-mesh screen, the granulate was dried at 45° C. and then again passed through the screen, the granulate thus obtained was admixed with the magnesium stearate, and the resulting composition was compressed into 310 mgm.-tablets in a conventional tablet making machine. Each tablet contained 200 mgm. of the crotonic acid compound and, when administered perorally to a warm-blooded animal of about 60 kg. body weight in need of such treatment, produced mainly a very effective antiphlogistic activity.

EXAMPLE 56

Coated pills

The pill core composition was compounded from the following ingredients:

| | Parts |
|---|---|
| 4 - [2″ - fluoro-biphenylyl-(4′)]-4-hydroxy-crotonic acid | 300.0 |
| Corn strach | 70.0 |
| Gelatin | 8.0 |
| Talcum | 18.0 |
| Magnesium stearate | 4.0 |
| Total | 400.0 |

Preparation

The crotonic acid compound and the corn starch were intimately admixed with each other, the mixture was granulated with an aqueous 10% solution of the gelatin through a 1.5 mm.-mesh screen, dried at 45° C. and again passed through the screen, the dry granulate was admixed with the talcum and the magnesium stearate, and the resulting composition was compressed into 400 mgm.-pill cores, which were subsequently coated with a thin shell consisting essentially of a mixture of talcum and sugar and finally polished with beeswax. Each coated pill contained 300 mgm. of the crotonic acid compound and, when administered perorally to a warm-blooded animal of about 60 kg. body weight in need of such treatment, produced mainly a very effective antiphlogistic activity.

EXAMPLE 57

Gelatin capsules

The capsule filler composition was compounded from the following ingredients:

| | Parts |
|---|---|
| 4 - [2″ - fluoro-biphenylyl-(4′)]-4-hydroxy-crotonic acid | 200.0 |
| Corn starch | 190.0 |
| Colloidal silicic acid | 6.0 |
| Magnesium stearate | 4.0 |
| Total | 400.0 |

Preparation

The ingredients were intimately and homogeneously admixed with each other, and 400 mgm.-portions of the mixture were filled into gelatin capsules of suitable size. Each capsule contained 200 mgm. of the crotonic acid compound and, when administered perorally to a warm-blooded animal of about 60 kg. body weight in need of such treatment, produced mainly a very effective antiphlogistic activity.

EXAMPLE 58

Suppositories

The suppository composition was compounded from the following ingredients:

| | Parts |
|---|---|
| Cyclohexylamine salt of 4-[2″-fluorobiphenylyl-(4′)]-4-hydroxy-crotonic acid | 300.0 |
| Cocoa butter | 1450.0 |
| Total | 1750.0 |

Preparation

The finely powdered crotonic acid compound was blended with an immersion homogenizer into the cocoa butter which had previously been melted and cooled to 40° C. 1750 mgm.-portions of the homogeneous mixture were then poured into slightly cooled suppository molds. Each suppository container 300 mgm. of the crotonic acid compound and, when administered by the rectal route to a warm-blooded animal of about 60 kg. weight in need of such treatment, produced mainly a very effective antiphlogistic activity.

EXAMPLE 59

Hypodermic solution

The solution was compounded from the following ingredients:

| | Parts |
|---|---|
| 4 - [2″ - fluoro-biphenylyl - (4′)]-4-hydroxy-crotonic acid | 150.0 |
| 1 N sodium hydroxide, q.s.ad, pH 9.0. | |
| Distilled water (by vol.), q.s.ad | 3000.0 |

Preparation

The crotonic acid compound was suspended in distilled water and brought into solution by addition of the sodium hydroxide until the solution had a pH of 9. The alkaline solution was diluted with distilled water to the indicated volume, filtered through a membrane filter until free from suspended matter, and filled into 3 ml.-ampules which were then sealed and sterilized at 120° C. for 20 minutes. Each ampule contained 150 mgm., and when the contents thereof were administered intramuscularly to a warm-blooded animal of about 60 kg. body weight in need of such treatment, mainly a very effective antiphlogistic activity was produced.

EXAMPLE 60

Suspension

The suspension was compounded from the following ingredients:

| | Parts |
|---|---|
| 4 - [2″ - fluoro-biphenylyl-(4′)]-4-hydroxy-crotonic acid | 4.0 |
| Dioctyl sodium sulfosuccinate (DONSS) | 0.02 |
| Benzoic acid | 0.1 |
| Sodium cyclamate | 0.2 |
| Colloidal silicic acid | 1.0 |
| Polyvinylpyrrolidone | 0.1 |
| Glycerine | 25.0 |
| Grapefruit flavoring | 0.1 |
| Distilled water (by vol.), q.s.ad | 100.0 |

Preparation

A sufficient amount of distilled water was heated to 70° C., and the DONSS, the bonzoic acid, the sodium cyclamate and the polyvinylpyrrolidone were successively dissolved therein. The glycerin and the aerosil were added to the solution, the resulting mixture was cooled to room temperature, and the finely pulverized crotonic acid compound was suspended therein with an immersion homogenizer. Thereafter, the flavoring was added, and the suspension was diluted to the indicated volume with distilled water. Each 5 ml. of the finished aqueous suspension contained 200 mgm. of the crotonic acid compound and, when administered perorally to a warm-blooded animal of about 60 kg. body weight in need of such treatment, produced mainly a very effective antiphlogistic action.

EXAMPLE 61

Coated pills

The pill core composition was compounded from the following ingredients:

| | Parts |
|---|---|
| 4-[2''-chloro-biphenylyl-(4')]-4-hydroxy-crotonic acid | 25.0 |
| Lactose | 55.0 |
| Corn starch | 37.0 |
| Polyvinylpyrrolidone | 2.0 |
| Magnesium stearate | 1.0 |
| Total | 120.0 |

Preparation

The crotonic acid compound, the lactose and the corn starch were intimately admixed with each other, the mixture was granulated with an aqueous 8% solution of the polyvinylpyrrolidone through a 1.5 mm.-mesh screen, and the granulate was dried at 45° C. and again passed through a 1.0 mm.-mesh screen and then admixed with the magnesium stearate. The resulting composition was compressed into 120 mgm.-pill cores, which were coated with a thin shell consisting essentially of a mixture of talcum and sugar, and the coated pills were polished with beeswax. Each pill contained 25 mgm. of the crotonic acid compound and, when administered perorally to a warm-blooded animal of about 60 kg. body weight in need of such treatment, produced mainly a very effective antitussive action.

EXAMPLE 62

Suppositories

The suppository composition was compounded from the following ingredients:

| | Parts |
|---|---|
| 4-[2''-chloro-biphenylyl-(4')]-4-hydroxy-crotonic acid | 25.0 |
| Cocoa butter | 1675.0 |
| Total | 1700.0 |

Preparation

The finely pulverized crotonic acid compound was stirred with an immersion emulsifier into the cocoa butter which had previously been melted and cooled to 40° C., and 1700 mgm.-portions of the mixture were poured at 36° C. into slightly cooled suppository molds. Each suppository contained 25 mgm. of the crotonic acid compound and, when administered by the rectal route to a warm-blooded animal of about 60 kg. body weight in need of such treatment, produced mainly a very effective antitussive action.

EXAMPLE 63

Hypodermic solution

The solution was compounded from the following ingredients:

| | Parts |
|---|---|
| 4-[2''-chloro-biphenylyl-(4')]-4-hydroxy-crotonic acid | 25.0 |
| Sorbitol | 80.0 |
| 1 N sodium hydroxide, q.s. ad, pH 8.0. | |
| Distilled water (by vol.), q.s. ad | 2000.0 |

Preparation

The crotonic acid compound was suspended in distilled water and brought into solution by addition of 1 N sodium hydroxide, the sorbitol was dissolved therein, the solution was adjusted to pH 8.0 with additional 1 N sodium hydroxide, and the alkaline solution was diluted with distilled water to the indicated volume, filtered through a membrane filter until free from suspended matter and filled into 2 ml.-ampules, which were then sealed and sterilized for 20 minutes at 120° C. Each ampule contained 25 mgm. of the crotonic acid compound, and when the contents thereof were administered intramuscularly to a warm-blooded animal of about 60 kg. body weight in need of such treatment, mainly a very effective antitussive action was produced.

EXAMPLE 64

Gelatin capsules

The capsule filler composition was compounded from the following ingredients:

| | Parts |
|---|---|
| 4-[2''-chloro-biphenylyl-(4')]-4-hydroxy-crotonic acid | 25.0 |
| Corn starch, dry | 175.0 |
| Total | 200.0 |

Preparation

The ingredients were intimately and homogeneously admixed with each other, and 200 mgm.-portions of the mixture were filled into size 4 gelatin capsules. Each capsule contained 25 mgm. of the crotonic acid compound and, when administered perorally to a warm-blooded animal of about 60 kg. body weight in need of such treatment, produced mainly a very effective antitussive action.

EXAMPLE 65

Suspension

The suspension was compounded from the following ingredients:

| | Parts |
|---|---|
| 4-[2''-chloro-biphenylyl-(4')]-4-hydroxy-crotonic acid | 0.5 |
| Dioctyl sodium sulfosuccinate (DONSS) | 0.01 |
| Benzoic acid | 0.1 |
| Sodium cyclamate | 0.2 |
| Colloidal magnesium aluminum silicate | 0.5 |
| Colloidal silicic acid | 0.5 |
| Polyvinylpyrrolidone | 0.1 |
| Glycerin | 10.0 |
| Banana flavoring | 0.1 |
| Distilled water (by vol.), q.s. ad | 100.0 |

Preparation

The DONSS was dissolved in about 15% of the required amount of distilled water, and the finely pulverized crotonic acid compound was suspended in the solution. The remaining amount of distilled water was heated to 80° C., the magnesium aluminum silicate and the silicic acid were suspended therein, and then the benzoic acid, the sodium cyclomate and the polyvinylpyrrolidone were dissolved therein, and the glycerin was added. The resulting mixture was cooled to room temperature, the flavoring was added, the aqueous suspension of the crotonic acid compound was stirred in, and the finished composition was homogenized. Each 5 ml. of the suspension contained 25 mgm. of the crotonic acid compound and when administered perorally to a warm-blooded animal of about 60 kg. body weight in need of such treatment, produced mainly a very effective antitussive action.

EXAMPLE 66

Tablets with combination of active ingredients

The tablet composition was compounded from the following ingredients:

| | Parts |
|---|---|
| 4-[2''-fluoro-biphenylyl-(4')]-4-hydroxy-crotonic acid | 200.0 |
| p-Ethoxy-acetanilide | 200.0 |
| Lactose | 75.0 |
| Corn starch | 100.0 |
| Polyvinylpyrrolidone | 20.0 |
| Magnesium stearate | 5.0 |
| Total | 600.0 |

Preparation

The tablet composition was compounded in a manner analogous to that described in Example 55, and compressed into 600 mgm.-tablets. Each tablet contained 200 mgm. of the crotonic acid compound and 200 mgm. of the acetanilide compound and when administered perorally to a warm-blooded animal of about 60 kg. body weight in need of such treatment, produced very effective antiphlogistic, analgesic and antipyretic actions.

Analogous results were obtained when another racemic or optionally active crotonic acid compound embraced by Formula I having the same pharmacological activity or a non-toxic salt thereof was substituted for the particular crotonic acid compound in Examples 55 through 66. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A racemic mixture of a compound of the formula

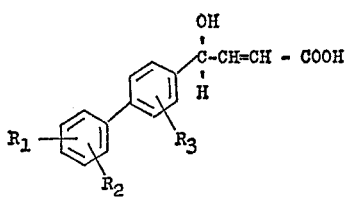

wherein, of the three substituents $R_1$, $R_2$ and $R_3$, one is hydrogen, and
two are selected from the group consisting of hydrogen, lower alkyl and halogen, an optically active antipode component thereof, or a non-toxic, pharmacologically acceptable salt of said racemic mixture or optically active antipode formed with an inorganic or organic base.

2. A racemic mixture of a compound of the formula

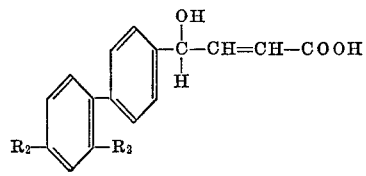

wherein $R_1$ is hydrogen, chlorine or fluorine, and
$R_2$ is hydrogen, chlorine or fluorine, an optically active antipode component thereof, or a non-toxic, pharmacologically acceptable salt of said racemic mixture or optically active antipode formed with an inorganic or organic base.

3. A compound according to claim 2, which is 4-[2″-fluoro-biphenylyl-(4′)]-4-hydroxy-crotonic acid or a non-toxic, pharmacologically acceptable salt thereof formed with an inorganic or organic base.

4. A compound according to claim 2, which is 4-[2″,4″-difluoro-biphenylyl-(4′)]-4-hydroxy-crotonic acid or a non-toxic, pharmacologically acceptable salt thereof formed with an inorganic or organic base.

5. A compound according to claim 2, which is 4-[2′-chloro-biphenylyl-(4′)] - 4 - hydroxy-crotonic acid or a non-toxic, pharmacologically acceptable salt thereof formed with an inorganic or organic base.

6. A compound according to claim 2, which is 4-[2″-fluoro-4″-chloro-biphenylyl-(4′)-] - 4 - hydroxy-crotonic acid or a non-toxic, pharmacologically acceptable salt thereof formed with an inorganic or organic base.

7. A compound according to claim 2, which is 4-[biphenylyl-(4′)]-4-hydroxy-crotonic acid or a non-toxic, pharmacologically acceptable salt thereof formed with an inorganic or organic base.

References Cited

Roberts et al.: "Basic Principles of Organic Chemistry," W. A. Benjamin, Inc. (1963), p. 546.
Gandini: Chem. Abst., 44, 9006i (1950).
Cavallini et al.: Chem. Abst., 55, 19868f.

JAMES A. PATTEN, Primary Examiner

J. F. TERAPANE, Assistant Examiner

U.S. Cl. X.R.

260—247.1, 284, 465 D, 470, 471, 473 A, 473 S, 515 R, 515 M, 515 A, 516, 519, 520, 592, 609 R; 424—248, 304, 308, 309, 317, 319

UNITED STATES PATENT OFFICE
CERTIFICATE OF CORRECTION

PO-1050 (5/69)

Patent No. 3,655,743     Dated April 11, 1972

Inventor(s) JOSEF NICKL, WOLFHARD ENGEL, ALBRECHT ECKENFELS, ERNST SEEGER and GUNTHER ENGELHARDT It is certified that error appears in the above-identified patent and that said Letters Patent are hereby corrected as shown below:

Col. 2, line 64, change "is" to --in--.
Col. 3, line 71, correct the spelling of "distillation".
Col. 4, line 64, change "2"-chloro" to --2'-chloro--;
                 insert closing parenthesis after "phenyl".
Col. 5, line 51, change "4'-methoxy" to read --4"-methoxy--;
        54,     "      "3'-chloro"   to read --3"-chloro--;
        56,     "      "4'-chloro"   to read --4"-chloro--;
        58,     "      "3'-nitro"    to read --3"-nitro--.

Col.14, line 41, change "[2("-bromo" to read --[2'-(bromo--.
Col.15, line 3, after "Example" insert --15--.
Col.19, line 37, insert closing parenthesis after "methanol";
       line 67, change "(4")]" to read --(4')]--.

Col.20, line 18, after "Proc." insert --Soc.--.

Col.21, line 16, correct the spelling of "starch".

Col.22, line 8, change "container" to read --contained--.

Col.24, line 50, correct the spelling of "cyclamate".

Signed and sealed this 9th day of January 1973.

(SEAL)
Attest:

EDWARD M.FLETCHER,JR.
Attesting Officer

ROBERT GOTTSCHALK
Commissioner of Patents